US008533801B2

(12) United States Patent
Carpenter et al.

(10) Patent No.: US 8,533,801 B2
(45) Date of Patent: *Sep. 10, 2013

(54) SYSTEM AND METHOD FOR BINDING A SUBSCRIPTION-BASED COMPUTING SYSTEM TO AN INTERNET SERVICE

(75) Inventors: Todd Carpenter, Monroe, WA (US); Shon Schmidt, Seattle, WA (US); David J. Sebesta, Redmond, WA (US); William J. Westerinen, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 100 days.

This patent is subject to a terminal disclaimer.

(21) Appl. No.: 13/159,886

(22) Filed: Jun. 14, 2011

(65) Prior Publication Data

US 2011/0271335 A1  Nov. 3, 2011

Related U.S. Application Data

(63) Continuation of application No. 11/696,356, filed on Apr. 4, 2007, now Pat. No. 7,984,497.

(51) Int. Cl.
| G06F 7/04 | (2006.01) |
| G06F 15/16 | (2006.01) |
| G06F 17/30 | (2006.01) |
| G06F 12/00 | (2006.01) |
| G06F 12/14 | (2006.01) |
| G06F 13/00 | (2006.01) |

(52) U.S. Cl.
USPC ............. 726/7; 726/1; 726/2; 726/3; 726/4; 726/6; 726/13; 726/16; 726/17; 726/21; 726/26; 726/29; 713/1; 713/153; 713/155; 713/160; 713/161; 713/171; 713/193; 713/194; 380/277; 380/278

(58) Field of Classification Search
USPC .............. 726/16, 34, 1–4, 6, 7, 13, 17, 21, 726/26, 39; 713/171, 1, 153, 155, 160, 161, 713/193, 194; 380/277, 278
See application file for complete search history.

(56) References Cited

U.S. PATENT DOCUMENTS

| 5,956,487 A | 9/1999 | Venkatraman et al. |
| 6,058,434 A | 5/2000 | Wilt et al. |

(Continued)

FOREIGN PATENT DOCUMENTS

| KR | 20010035171 A | 5/2001 |
| KR | 20060108605 | 10/2006 |

(Continued)

OTHER PUBLICATIONS

An efficient and lightweight embedded Web server for Web-based network element management. http://delivery.acm.org/10.1145/360000/351315/p261-ju.pdf?key1=351315&key2=381434171&coll=GUIDE&dl+GUIDE&CFID=14332521&CFTOKEN=53218555.

(Continued)

*Primary Examiner* — Edan Orgad
*Assistant Examiner* — Kari Schmidt
(74) *Attorney, Agent, or Firm* — Westman, Champlin & Kelly, P.A.

(57) ABSTRACT

A system for binding a subscription-based computer to an internet service provider (ISP) may include a binding module and a security module residing on the computer. The binding module may identify and authenticate configuration data from peripheral devices that attempt to connect to the computer, encrypt any requests for data from the computer to the ISP, and decrypt responses from the ISP. If the binding module is able to authenticate the configuration data and the response to the request for data from the ISP, then the security module may allow the communication between the computer and the ISP. However, if either the configuration cycle or the response cannot be properly verified, then the security module may degrade operation of the computer.

19 Claims, 5 Drawing Sheets

(56) References Cited

U.S. PATENT DOCUMENTS

| | | | |
|---|---|---|---|
| 6,112,305 | A | 8/2000 | Dancs et al. |
| 6,141,752 | A | 10/2000 | Dancs et al. |
| 6,260,148 | B1 | 7/2001 | Aggarwal et al. |
| 6,373,841 | B1 | 4/2002 | Goh et al. |
| 7,010,608 | B2 * | 3/2006 | Garg et al. ............... 709/229 |
| 7,085,835 | B2 | 8/2006 | Bantz et al. |
| 7,418,511 | B2 | 8/2008 | Takechi et al. |
| 7,469,279 | B1 | 12/2008 | Stamler et al. |
| 7,571,143 | B2 * | 8/2009 | Circenis et al. .............. 705/400 |
| 7,984,497 | B2 | 7/2011 | Carpenter et al. |
| 2003/0039240 | A1 | 2/2003 | Sutanto |
| 2003/0133572 | A1 * | 7/2003 | Fish et al. ............... 380/232 |
| 2003/0135380 | A1 * | 7/2003 | Lehr et al. ............... 705/1 |
| 2003/0177187 | A1 * | 9/2003 | Levine et al. ............... 709/205 |
| 2003/0220834 | A1 | 11/2003 | Leung et al. |
| 2004/0133689 | A1 * | 7/2004 | Vasisht ............... 709/228 |
| 2004/0176071 | A1 * | 9/2004 | Gehrmann et al. ........... 455/411 |
| 2005/0086534 | A1 | 4/2005 | Hindawi et al. |
| 2005/0210456 | A1 | 9/2005 | Chen et al. |
| 2005/0227669 | A1 * | 10/2005 | Haparnas ............... 455/410 |
| 2006/0236084 | A1 * | 10/2006 | Wu et al. ............... 713/2 |
| 2006/0271695 | A1 | 11/2006 | Lavian |
| 2007/0074240 | A1 * | 3/2007 | Addington et al. .............. 725/25 |
| 2007/0179778 | A1 | 8/2007 | Gong et al. |
| 2008/0114830 | A1 | 5/2008 | Welingkar et al. |
| 2008/0117075 | A1 | 5/2008 | Seddigh et al. |
| 2008/0216146 | A1 * | 9/2008 | Gautier ............... 725/139 |

FOREIGN PATENT DOCUMENTS

| | | |
|---|---|---|
| WO | 0131852 A1 | 5/2001 |
| WO | 0201853 | 1/2002 |

OTHER PUBLICATIONS

Sizzle: A Standards-based End-to-End Security Architecture for the Embedded Internet http://reasearch.sun.com/technical-reports/2005smli_tr-2005-145.pdf.

Networked Embedded Greenhouse Monitoring and Control http://laris.fesb.hr/PDF/stipanicev-marasovic-2003.pdf.

RU Patent Application No. 2009136564 Office Action dated Nov. 18, 2011 (Russian Only).

Written Opinion for PCT/US2008/059282 mailed Sep. 24, 2008.

International Search Report for PCT/US2008/059282 mailed Sep. 24, 2008.

Bantz et al., "The Emerging Model of Subscription Computing," IT Professional 4, 4 (Jul. 2002), pp. 27-32.

* cited by examiner

SYSTEM AND METHOD FOR BINDING A SUBSCRIPTION-BASED COMPUTING SYSTEM TO AN INTERNET SERVICE

The present application is a continuation of and claims priority of U.S. patent application Ser. No. 11/696,356, filed Apr. 4, 2007, the content of which is hereby incorporated by reference in its entirety.

BACKGROUND

This Background is intended to provide the basic context of this patent application and is not intended to describe a specific problem to be solved.

Pay-as-you-go or pay-per-use and subscription business models have been used in many areas of commerce, from cellular telephones to commercial launderettes. In developing a pay-as-you go business, a provider, for example, a cellular telephone provider, offers the use of hardware (a cellular telephone) at a lower-than-market cost in exchange for a commitment to remain a subscriber to their network. In this specific example, the customer receives a cellular phone for little or no money in exchange for signing a contract to become a subscriber for a given period of time. Over the course of the contract, the service provider recovers the cost of the hardware by charging the consumer for using the cellular phone.

The pay-as-you-go business model is predicated on the concept that the hardware provided has little or no value, or use, if disconnected from the service provider. To illustrate, should the subscriber mentioned above cease to pay his or her bill, the service provider deactivates their account, and while the cellular telephone may power up, calls cannot be made because the service provider will not allow them. The deactivated phone has no "salvage" value, because the phone will not work elsewhere and the component parts are not easily salvaged nor do they have a significant street value. When the account is brought current, the service provider will reconnect the device to network and allow the subscriber to make calls.

This model works well when the service provider, or other entity taking the financial risk of providing subsidized hardware, has tight control on the use of the hardware and when the device has little salvage value. This business model does not work well when the hardware has substantial uses outside the service provider's span of control. Thus, a typical personal computer does not meet these criteria since a personal computer may have substantial uses beyond an original intent and the components of a personal computer, e.g. a display or disk drive, may have a significant salvage value.

In a typical pay-as-you-go computing system, a user leases or subscribes to an internet service provider (ISP) or other underwriter for a monthly fee which includes a PC and a limited amount of downloaded content. The ISP relies on the user downloading more than the limited amount included in the subscription for profit. However, should the same user subscribe to another ISP or otherwise be able to download content from another ISP, a user may effectively circumvent the original subscription agreement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A system for binding a subscription-based computer to an internet service provider (ISP) may include a binding module and a security module residing on the computer. The binding module may identify and authenticate configuration data from peripheral devices that attempt to connect to the computer, encrypt any requests for data from the computer to the ISP, and decrypt responses from the ISP. If the binding module is able to authenticate the configuration data and the response to the request for data from the ISP, then the security module may allow the communication between the computer and the ISP. However, if either the configuration cycle or the response cannot be properly verified, then the security module may degrade operation of the computer.

SPECIFICATION

Figure 1:
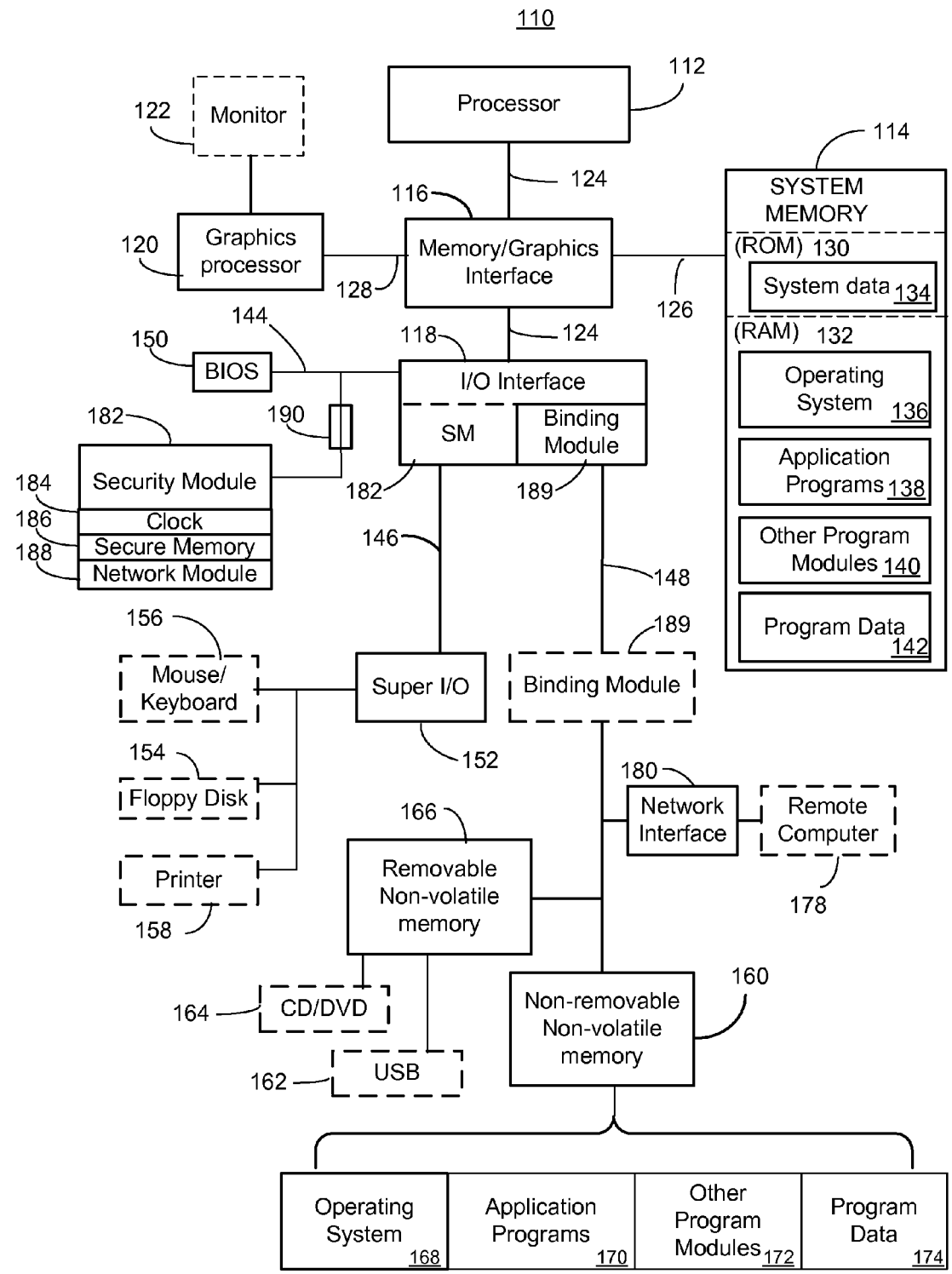
FIG. 1 is an illustration of a computer that implements a method or includes an apparatus for binding communication between a subscription-based or pay-per-use computer system and an ISP.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader. It is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the present invention's principles and concepts, further discussion of such software and ICs, if any, will be limited to the essentials with respect to the preferred embodiments.

Many prior-art high-value computers, personal digital assistants, organizers, and the like, are not suitable for secure subscription use without modification. The ability to enforce a contract requires a service provider, i.e., an "ISP" or other enforcement entity, to be able to affect a device's operation even though the device may not be connected to the service provider, e.g. connected to the Internet. A first stage of enforcement may include a simple pop up or other graphical interface warning, indicating the terms of the contract are nearing a critical point. A second stage of enforcement, for example, after pay-per-use minutes have expired or a subscription period has lapsed, may be to present a system modal user interface for adding value and restoring service. A provider's ultimate leverage for enforcing the terms of a subscription or pay-as-you go agreement is to disable the device. Such a dramatic step may be appropriate when it appears that the user has made a deliberate attempt to subvert the metering or other security systems active in the device.

Uses for the ability to place an electronic device into a limited function mode may extend beyond subscription and pay-per-use applications. For example, techniques for capacity consumption could be used for licensing enforcement of an operating system or individual applications.

FIG. 1 illustrates a logical view of a computing device in the form of a computer 110 that may be used in a pay-per-use or subscription mode. For the sake of illustration, the computer 110 is used to illustrate the principles of the instant disclosure. However, such principles apply equally to other electronic devices, including, but not limited to, cellular telephones, personal digital assistants, media players, appliances, gaming systems, entertainment systems, set top boxes, and automotive dashboard electronics, to name a few. With reference to FIG. 1, an exemplary system for implementing the claimed method and apparatus includes a general purpose computing device in the form of a computer 110. Components shown in dashed outline are not technically part of the computer 110, but are used to illustrate the exemplary embodiment of FIG. 1. Components of computer 110 may include, but are not limited to, a processor 112, a system memory 114, a memory/graphics interface 116, also known as a Northbridge chip, and an I/O interface 118, also known as a Southbridge chip. The memory 114 and a graphics processor 120 may be coupled to the memory/graphics interface 116. A monitor 122 or other graphic output device may be coupled to the graphics processor 120.

A series of system busses may couple various system components including a high speed system bus 124 between the processor 112, the memory/graphics interface 116 and the I/O interface 118, a front-side bus 126 between the memory/graphics interface 116 and the system memory 114, and an advanced graphics processing (AGP) bus 128 between the memory/graphics interface 116 and the graphics processor 120. The system bus 124 may be any of several types of bus structures including, by way of example, and not limitation, an Industry Standard Architecture (ISA) bus, Micro Channel Architecture (MCA) bus and Enhanced ISA (EISA) bus. As system architectures evolve, other bus architectures and chip sets may be used but often generally follow this pattern. For example, companies such as Intel and AMD support the Intel Hub Architecture (IHA) and the Hypertransport architecture, respectively.

Computer 110 typically includes a variety of computer readable media. Computer readable media may be any available media that is accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 114 includes computer storage media in the form of volatile and/or nonvolatile memory such as read only memory (ROM) 130 and random access memory (RAM) 132. The system ROM 130 may contain permanent system data 134, such as identifying and manufacturing information. In some embodiments, a basic input/output system (BIOS) may also be stored in system ROM 130. RAM 132 typically contains data and/or program modules that are immediately accessible to and/or presently being operated on by processor 112. By way of example, and not limitation, FIG. 1 illustrates operating system 136, application programs 138, other program modules 140, and program data 142.

The I/O interface 118 may couple the system bus 124 with a number of other busses 144, 146, and 148 that join a variety of internal and external devices to the computer 110. A serial peripheral interface (SPI) bus 144 may connect to a basic input/output system (BIOS) memory 150 containing basic routines to help transfer information between elements within computer 110. For example, the BIOS may execute during start-up.

A super input/output chip 152 may be used to connect to a number of 'legacy' peripherals, such as floppy disk 154, keyboard/mouse 156, and printer 158. In one embodiment, the super I/O chip 152 is connected to the I/O interface 118 with a low pin count (LPC) bus 146. The super I/O chip is widely available in the commercial marketplace.

In one embodiment, bus 148 may be a Peripheral Component Interconnect (PCI) bus, or a variation thereof, may be used to connect higher speed peripherals to the I/O interface 118. A PCI bus may also be known as a Mezzanine bus.

Variations of the PCI bus include the Peripheral Component Interconnect-Express (PCI-E) and the Peripheral Component Interconnect-Extended (PCI-X) busses, the former having a serial interface and the latter being a backward compatible parallel interface. In other embodiments, bus 148 may be an advanced technology attachment (ATA) bus, in the form of a serial ATA bus (SATA) or parallel ATA (PATA).

The computer 110 may also include other removable/non-removable, volatile/nonvolatile computer storage media. By way of example only, FIG. 1 illustrates a hard disk drive 160 that reads from or writes to non-removable, nonvolatile magnetic media. Removable media, such as a universal serial bus (USB) memory 162 or CD/DVD drive 164 may be connected to the PCI bus 148 directly or through an interface 166. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like.

The drives and their associated computer storage media discussed above and illustrated in FIG. 1, provide storage of computer readable instructions, data structures, program modules and other data for the computer 110. In FIG. 1, for example, hard disk drive 160 is illustrated as storing operating system 168, application programs 170, other program modules 172, and program data 174. Note that these components can either be the same as or different from operating system 136, application programs 138 other program modules 140, and program data 142. Operating system 168, application programs 170, other program modules 172, and program data 174 are given different numbers here to illustrate that, at a minimum, they are different copies. A user may enter commands and information into the computer 110 through input devices such as a mouse/keyboard 156 or other input device combination. Other input devices (not shown) may include a microphone, joystick, game pad, satellite dish, scanner, or the like. These and other input devices are often connected to the processing unit 112 through one of the I/O interface busses, such as the SPI 144, the LPC 146, or the PCI 148, but other busses may be used. In some embodiments, other devices may be coupled to parallel ports, infrared interfaces, game ports, and the like (not depicted), via the super I/O chip 152.

The computer 110 may operate in a networked environment using logical connections to one or more remote computers, such as a remote computer 178 via a network interface controller (NIC) 180. The remote computer 178 may be a personal computer, a server, a router, a network PC, a peer device or other common network node, and typically includes many or all of the elements described above relative to the computer 110. The logical connection depicted in FIG. 1 may include a local area network (LAN), a wide area network (WAN), or both, but may also include other networks. Such networking environments are commonplace in offices, enterprise-wide computer networks, intranets and the Internet.

In some embodiments, the network interface may use a modem (not depicted) when a broadband connection is not available or is not used. It will be appreciated that the network connection shown is exemplary and other means of establishing a communications link between the computers may be used.

The computer 110 may also include a security module (SM) 182. The SM 182 may be enabled to perform security monitoring, pay-per-use and subscription usage management, and policy enforcement related to terms and conditions associated with paid use. The SM 182 may be particularly suited to securely enabling a computer 110 in a subsidized purchase business model. The SM 182 may be a set of virtualized containers executing on the processor 112 or real containers such as an embedded processor or controller. In one embodiment, the SM 182 is connected to I/O Interface 118 on the SPI bus 144. In another embodiment, the SM 182 may be embodied in the processing unit 112, part of the I/O Interface 118, as a standalone component, or in a hybrid, such as a multi-chip module. A clock 184 may be incorporated into the SM 182 to help ensure tamper resistance. To allow user management of local time setting, including daylight savings or movement between time zones, the clock 184 may maintain its time in a coordinated universal time (UTC) format and user time may be calculated using a user-settable offset. The SM 182 may also include a cryptographic function (not depicted).

Additionally, the SM may include firmware or other form of secure memory 186. The secure memory 186 may include routines or applications that may facilitate the secure operation of the computer 110 through the security module 182. Additionally, the secure memory 186 may include any other data that may be securely accessed, stored, or modified without unauthorized tampering. In one embodiment, the secure memory 186 includes a lower provisioning module (LPM) that manages the allocation of the usage time. The LPM of the secure memory 186 may act as a secure execution environment of the SM 182 and may account for a user's pre-paid access time or subscription information. Additionally, the LPM may be described by U.S. patent application Ser. Nos. 10/988,907, and 11/612,433 the entire disclosure of which is hereby incorporated by reference.

The secure memory 186 may also include a cryptographic core that may act as an authentication device for all communication between the SM 182 and other devices. For example, the cryptographic core of the execution unit 225 may provide a processing and encryption subsystem of the security module 182 that reaches a suitable Common Criteria Evaluation Assurance Level to ensure that the computer 110 and any communication with the SM 182 may not be compromised.

The memory 186 may also include storage for system-critical items such as a BIOS for a computer or other electronic device in which the SM 182 is operating. The secure memory 186 may also include memory dedicated to the operation of the SM 182 itself, such as storage, for example, for storing metering code to access and decrement subscription data. The secure memory 186 may also act as a repository for subscription or pay-per-use data such as data representing an amount of access time. With the LPM, the access time data may be decremented during computer 110 use. Further, an application for use in providing functionality during limited operation modes, such as a "hardware limited mode," (HLM) may also be stored in the secure memory 186. To support a limited operation mode, a second BIOS, and optionally, an alternate copy of the second BIOS, may also be stored in the secure memory 186. The second BIOS may be used for booting the computer or other electronic device incorporating the SM 182. The second BIOS may be activated as a secure boot environment to replace the standard BIOS 150 to enforce a subscription or other security policy. Furthermore, the SM 182 may also have an ability to force a system reset at any time which may ensure that pay per use or subscription terms are met, as well as provide a clean environment to start with either a normal or a restricted operation BIOS.

The SM 182 may also include a network module 188 in communication with the LPM. The network module 188 may include a network stack that may control all network traffic to the OS 136, 168 through the SM 182. For example, the network module 188 may be implemented in a 32-bit RISC Microcontroller. One example of a suitable microcontroller may be the LPC2378 microcontroller manufactured by NXP Semiconductors of Eindhoven, The Netherlands. Additionally, the network module 188 may include a web server within the SM 182 that may host a number of interfaces that allow secure management of a subscription-based computing system. In one embodiment, the network module 188 includes a number of user interfaces as web pages in a standard publishing format that are served to the user through the SM 182. The standard publishing format may be Hypertext Markup Language or any similar format. The network module 182 may also include a cryptographic module or function that may encrypt all communications between an internet service provider (ISP) and the computer 100 using a secret key stored in the secure memory 186. In another embodiment, the network module 188 manages a network stack and provides packet filtering and redirection within a subscription-based or pay-per-use computing system. The network module may be in communication with or act as a substitute for the LPM and/or an upper provisioning module (UPM) as described in U.S. patent application Ser. No. 10/988,907, and U.S. patent application Ser. No. 11/612,433.

Figure 2:
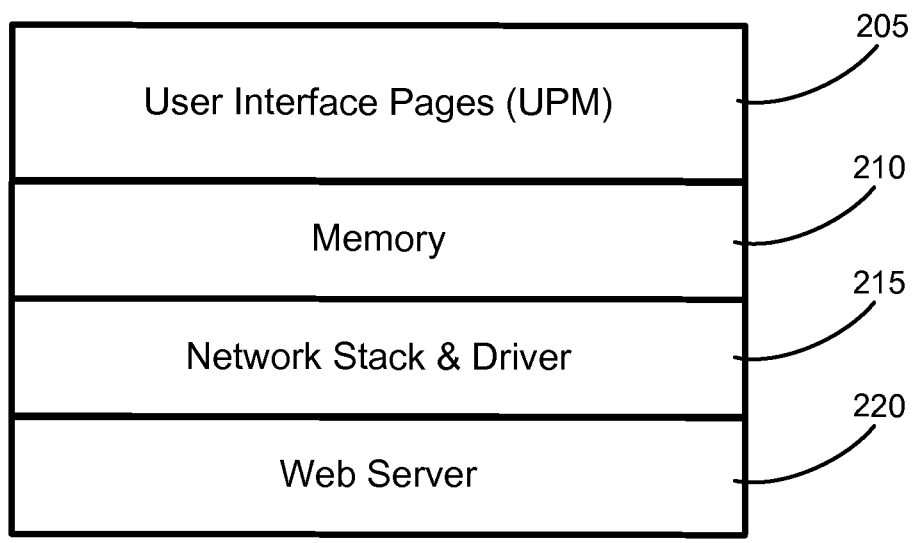
FIG. 2 is a simplified and representative block diagram of a network module of a secure computing system.

With reference to FIG. 2, the network module 188 may be in communication with the SM 182. In one embodiment, the network module includes a UPM in the form of a number of web pages in an OS independent format 205, a memory 210, a network stack and driver 215, and a web server 220. In one embodiment, the UPM 205 is a series of web pages that allow a user to add access time and perform other subscription account administrative functions. The UPM 205 may be hosted inside the web server 220 and may invoke the LPM, as previously discussed, to retrieve information to be presented on the web sites that are served by the web server 220 to a web browser executing on the OS. In a further embodiment, the web sites invoke the LPM to retrieve a current time balance and provide packets to provision access time from the SM 182 to the computer 110. The network stack and driver 215 may make a network port available to the OS during operation of the computer 110. In one embodiment, the network stack and driver 215 determines if incoming requests are destined for the web server 220 based on an internet protocol (IP) address and a port of the incoming packet. For example, if the incoming packet is for the web server 220, then the network stack and driver 215 may forward the packet to the web server 220 unencrypted. However, if the incoming packet is destined for another location, i.e., a remote computer 178, then the network stack and driver 215 may encrypt the packet and send it to its destination. In one embodiment, the network stack and driver 215 may provide a processing and encryption subsystem of the module 188 that reaches a suitable Common Criteria Evaluation Assurance Level to ensure that the module 188 and any communication between the computer 110 and an outside device 178 may not be compromised. In a further embodiment, the network stack and driver 215 manages all communication from the computer 110 to a system that manages user subscription information, as further discussed in relation to FIG. 4.

Figure 3:
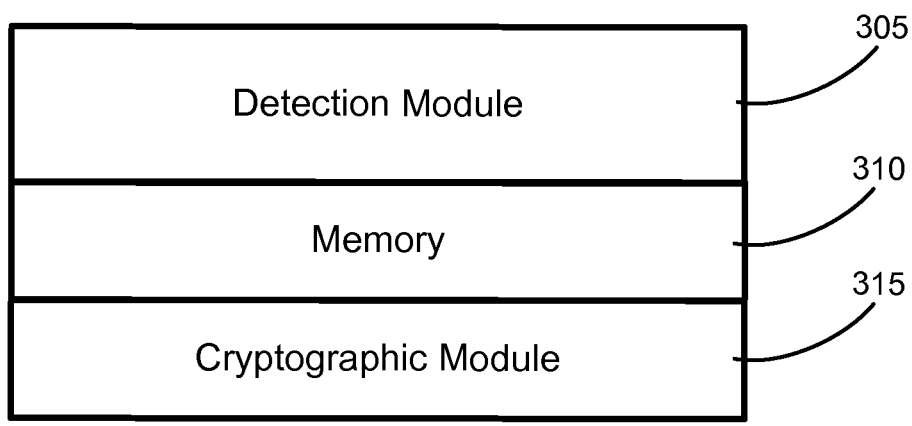
FIG. 3 is a simplified and representative block diagram of a binding module of a computing system.

With reference to FIG. 3, a binding module 189 may be integrated into the I/O Interface 118. The binding module 189 may communicate directly with the SM 182 within the I/O interface 118, over one of several busses, for example, the SPI bus 144, or over a dedicated communication line. The binding module 189 may include various components to ensure that the computer 110 may only communicate externally with a particular ISP, several ISPs, a class or type of peripheral device, or any other desired system or device. In one embodiment, the binding module may only allow the computer 110 to communicate with an ISP to which a user of the computer 110 is a subscriber.

The binding module 189 may include a detection module 305. The detection module 305 may include logic implemented as hardware, software or another form of computer readable instructions that may identify communications from the NIC 180 or other peripheral devices 160, 166. In one embodiment, the binding module 189 is an integrated circuit that detects configuration information or events originating from any type of peripheral device. For example, when an OS 136, 168 enumerates a peripheral device, either during a boot-up procedure or if a user connects a peripheral device after a boot-up procedure, the I/O Interface 118 may receive a configuration packet or other communication data from the peripheral device. The binding module 189 may then detect, with the detection module 305, configuration packets, cycles, or any other forms of communication or connection events from the peripheral device to the I/O Interface 118 over any of the busses 124, 144, 146, 148 in communication with the I/O Interface 118. The communication may originate from any peripheral device including, but not limited to devices described as or implementing protocols compatible with USB, 1394, PCI, network, NICs, hard drives, flash devices, or other devices.

The binding module 189 may also include memory 310 for storing detected information and a list of acceptable ISPs and other sources of approved configuration information. In one embodiment, the binding module 189 will discard any data it receives from an unauthorized peripheral device or originating from anything other than a set of approved devices or ISPs. By discarding unauthorized communications at the I/O Interface 118, the binding module 189 may prevent communication originating from an unauthorized source from reaching its intended destination by preventing the computer 110 from processing any unauthorized data. For example, the binding device 189 may identify the first communication received at the I/O Interface 118 having a device class of network controller. All future communications originating from a network controller and matching the characteristics of the first-identified network controller may then be passed to the intended destination.

Alternatively, the binding module 189 may communicate with the memory 310 or other storage that includes a list of authorized peripheral sources for data arriving at the module 189 or the I/O Interface 118 and only permit data matching a characteristic of the list to reach its destination. Further, the binding module 189 may communicate with a peripheral device to determine if it contains a secret identifier or other cryptographic function to permit communication between the device and the I/O Interface 118. Allowing the binding module 189 to cryptographically authenticate communication received at the I/O Interface 118 may permit more than one peripheral device or network interface 180 to communicate with the computer 110. Of course, the memory may also include a list of excluded sources whereby a match would prevent the incoming data from reaching its intended destination. For example, the binding module 189 may exclude data coming to the I/O Interface 118 with a device class of network controller after a first network controller is authenticated. Many other methods of permitting only authorized data from reaching its intended destination through the I/O Interface 118 are also possible.

Further, the binding module 189 may include a cryptographic module 315 that may encrypt communications from the computer 110 to a remote computer 178. In one embodiment, the cryptographic module 315 may authenticate data received at the I/O Interface 118 as from an approved source. For example, the cryptographic module 315 may decrypt communication from a peripheral device to determine its authenticity as originating from one or a number of approved sources. In another embodiment, the cryptographic module sends an encoded "heartbeat" signal to the remote computer 178 or ISP at a random interval. Because only an ISP that is able to decrypt the heartbeat signal may be able to answer the signal, the cryptographic module 315 may ensure that the computer 110 only communicates with specific ISPs. In a further embodiment, the binding device 189 may include the LPM as described in relation to the SM 182. In a still further embodiment, the LPM and binding module 189 may be incorporated into the NIC 180. The binding module 189 may also be connected to the PCI bus 148 between the NIC 180 and I/O Interface 118 or other computer 110 components to communicate with the SM 182. For example, for the binding module 189 to be located outside of the I/O Interface 118, the busses 124, 144, 146, 148 in communication with the I/O Interface 118 may be configured to "no connect" while replicating this functionality within the binding module 189, Other embodiments may include an activation fuse 190. The fuse 190 may be any type of device or firmware that may be selectively activated from an inactive state to enable communication between the I/O Interface 118 and the SM 182. When deactivated, i.e., when the fuse 190 does not maintain a connection between the SM 182 and the I/O Interface 118, the computer 110 may not operate as a subscription-based computing device, but rather, as a normal PC. However, when activated, i.e., when the fuse 189 maintains a connection between the SM 182 and the I/O Interface 118, the computer may operate as a subscription-based computing device. In one embodiment, the fuse 190, once activated to enable communication between the SM 182 and other components and devices, may not be deactivated. For example, the computer 110 may be manufactured initially to operate as a normal, non-subscription-based PC and may later be activated by an underwriter or subscriber to operate as a subscription-based PC. Therefore, while the fuse is activated and upon boot-up, connection, or disconnection of the device 188, firmware of the SM 182 (i.e., the previously-described local provisioning module of the secure memory 186) may seek subscription or usage time stored in the metered computing device 188.

Figure 4:
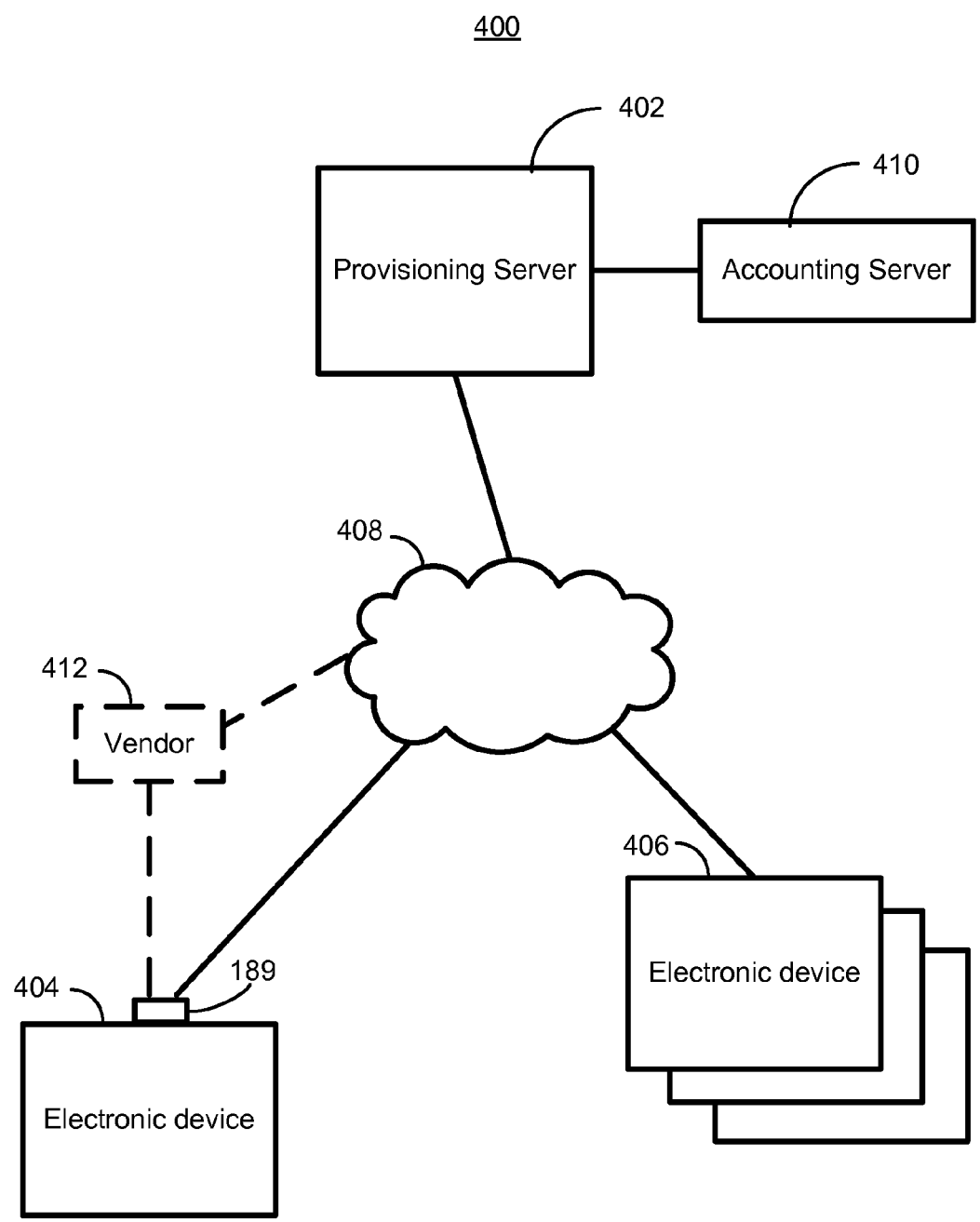
FIG. 4 is a simplified and exemplary block diagram of a system supporting a pay-per-use and subscription computing business model.

FIG. 4 is a simplified and exemplary block diagram of a system 400 supporting pay-per-use and subscription usage of a computer or other electronic device. A provisioning server 402 may serve as a trusted endpoint for provisioning requests from one or more electronic devices participating in the pay-per-use business ecosystem. One electronic device 404 may be similar to computer 110 of FIG. 1 including the SM 182, and at least one of a network module 188 and a binding module 189. Other electronic devices 406 may perform substantially the same as the exemplary device 404. Communication between the provisioning server 402 and the electronic device 404 may be accomplished through a network 408 to a NIC 180 of the computer 110 and that may include landline, wireless, or broadband networks, or other networks known in the art.

An accounting server 410 may be linked to the provisioning server 402 and may maintain account data corresponding to the electronic device 404. Account data may also be stored at the SM 182. The accounting server 410 may also serve as a clearinghouse for financial transactions related to the electronic device 404, such as, replenishing or adding value to a pay-per-use account maintained on the accounting server 410. In one embodiment, the electronic device 404, communicating through the NIC 180, through the binding module 189, establishes a connection with a vendor 412 that communicates with the accounting server 410. In another embodiment, the device 404 establishes a connection directly with the accounting server 410 through the module 189. During use, an LPM within the SM 182 of the device 404 may decrement access data stored in the secure memory 186. The access data may be any value, access time for operating any secure OS or application of the electronic device 404, 406, or any other data that may be recorded at the accounting server 410 and stored at the SM 182 for use with a computer 110. In a further embodiment, the user may purchase a generic amount of time that may be used for any OS, application, or any other activity at a secure electronic device 404. Of course, many other types of data, access time, and subscription information may be purchased and stored at the SM 182 or an accounting server 410.

Figure 5:
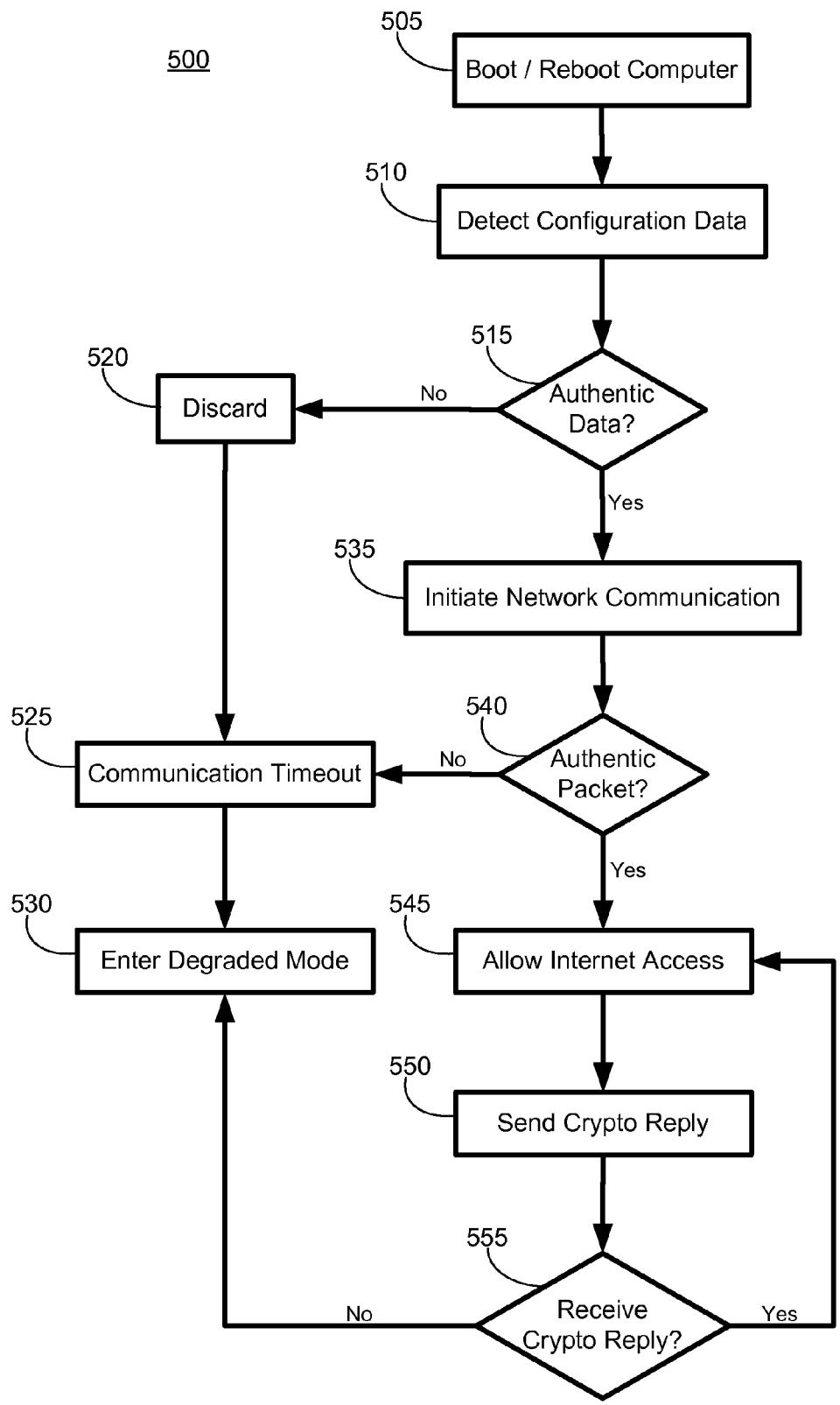
FIG. 5 is a simplified and exemplary block diagram of a method for binding communication between a subscription-based computing system and an ISP.

FIG. 5 is a simplified and exemplary block diagram of a method 500 for binding a subscription-based computer 110 to a particular ISP. At block 505, a user desiring to operate a subscription-based computer 110 with a binding module 189 and a security module 182 including the network module 188 may boot or re-boot the computer 110. Upon boot or reboot, peripheral devices may communicate configuration or other data to the computer 110. In one embodiment, upon boot-up, the I/O Interface 118 receives configuration data from a peripheral device. For example, a network interface card (NIC) 180 may seek to establish a connection with the computer 110 by sending configuration data to the I/O Interface 118. Alternatively, the I/O Interface 118 may request configuration data from all connected devices.

At block 510, the I/O Interface 118 may detect configuration data. In one embodiment, the detection module 305 distinguishes configuration data sent to the I/O interface 118 from a peripheral device. For example, a network interface card 180 or other device may send a configuration cycle to the I/O Interface 118 upon a boot or re-boot process or upon a connection to the computer 110. The configuration cycle may then be intercepted by the detection module 305.

At block 515, the binding module 189 may authenticate the received configuration data. In one embodiment, the detection module 305 may process the configuration data to determine its source or other identification data. For example, the detection module 305 may process a configuration cycle packet to determine if it originates from a source that matches data retrieved from an approved source list stored in the memory 310. In another embodiment, the detection module 305 may communicate with the peripheral device that sent the configuration data to determine if the sending device contains an acceptable key or other piece of cryptographic data. For example, the binding device 189 may prompt the peripheral device 180 to send an encrypted message to the I/O Interface 118. The detection module 305 may then intercept the encrypted message and communicate with the cryptographic module 315 to authenticate the received message.

If, at block 515, the configuration data is not authentic, then, at block 520, the method 500 may discard the data which may, at block 525, cause the peripheral device to timeout. Additionally, at block 530, configuration data that is not authenticated may cause the computer to enter a degraded mode such as HLM, as previously described. If, at block 515, the configuration data is authentic, at block 535, the peripheral device 180 may initiate further communication with the computer 110. In one embodiment, the user initiates a web browser executing on the OS 136, 168 of the computer 110. The LPM within the secure memory 186 of the SM 182 or within the binding module 189 may send a packet to a remote computer 178 at the ISP. In one embodiment, the packet may contain a random number or may be signed to identify the packet as belonging to the subscription-based computer 110.

At block 540, the ISP may receive and authenticate the packet from the computer 110. If, at block 545, the ISP determines that the received packet is authentic, then, at block 545, the ISP may allow the computer 110 access to the internet. In one embodiment, the ISP and computer 110 may authenticate the communication using PKI or other suitable cryptographic techniques. If, at block 540, the ISP determines that the received packet is not authentic, then, at block 525, the communication may timeout and, at block 530, the LPM of the SM 182 or binding module 189 may force the computer 110 into a degraded mode of operation.

At block 550, the ISP may send a cryptographic reply to the computer 110. In one embodiment, the ISP sends a "heartbeat" packet to the computer 110 at a random interval. The random interval may be below a threshold time that, if exceeded, the LPM may force the computer 110 into a degraded mode. If, at block 555, the LPM does not receive the cryptographic reply, then the LPM may force the computer 110 into a degraded mode of operation at block 530. In one embodiment, the LPM may limit the computer's 110 capability until a connection is restored with the ISP or it receives the cryptographic signal. In another embodiment, the type of response, allowable latency, and any other parameter required by the LPM is included in the cryptographic packets between the binding module 189 and the SM 182.

If, at block 555, the computer receives and authenticates the cryptographic reply of block 550, then the method 500 may return to block 545 to allow the computer 110 continued internet access. In one embodiment, the LPM of the SM 182 or the binding module 189 may authenticate the reply by detecting configuration cycles as described in relation to FIG. 3. In a further embodiment, only configuration cycles or properly-authenticated packets may be accepted by the LPM for processing and continued access of the computer 110 to the ISP. Thus, a binding module 189 may bind a subscription-based computer 110 to a particular ISP.

Many modifications and variations may be made in the techniques and structures described and illustrated herein without departing from the spirit and scope of the present invention. Accordingly, it should be understood that the methods and apparatus described herein are illustrative only and are not limiting upon the scope of the invention.

What is claimed:

1. A method for binding a subscription-based computer to an internet service provider (ISP) comprising:
   receiving configuration data from a peripheral device at the subscription-based computer;
   determining if a source of the configuration data is authentic;
   communicating an encrypted packet from the subscription-based computer to a remote computer of the ISP if the source of the configuration data is authentic, the encrypted packet uniquely identifying the subscription-based computer;
   receiving a heartbeat packet from the remote computer at the subscription-based computer, if the encrypted packet is authenticated at the remote computer;
   authenticating the heartbeat packet at the subscription-based computer; and
   controlling the subscription-based computer to maintain communication with the ISP if the heartbeat packet is authentic.

2. The method of claim 1 wherein the heartbeat packet includes an encrypted ping message from the ISP to the subscription-based computer.

3. The method of claim 1 wherein receiving the heartbeat packet comprises:
   receiving the heartbeat packet from the remote computer at a random time interval.

4. The method of claim 1 wherein controlling the subscription-based computer comprises:
   degrading operation of the subscription-based computer if the source of the configuration data is not authentic.

5. The method of claim 4 wherein controlling the subscription-based computer comprises:
   degrading the operation of the subscription-based computer if the heartbeat packet is not authentic.

6. The method of claim 5 wherein controlling the subscription-based computer comprises:
   degrading the operation of the subscription-based computer if the encrypted packet is not authentic.

7. The method of claim 6 wherein controlling the subscription-based computer comprises:
   degrading the operation of the subscription-based computer if communication between the ISP and the subscription-based computer is disrupted.

8. The method of claim 7 wherein controlling the subscription-based computer comprises:
   degrading the operation of the subscription-based computer if the configuration data does not belong to a network interface controller of the subscription-based computer.

9. A system for binding a subscription-based computer to a service provider, the system comprising:
   a processor of the subscription-based computer;
   a binding module residing on the subscription-based computer including computer storage media having computer executable instructions comprising:
      a detection module identifying configuration data received from a peripheral device of the subscription-based computer;
      a validation module authenticating the configuration data; and
   a security module residing on the subscription-based computer, in communication with the binding module, including computer storage media, having computer executable instructions comprising a network module that degrades operation of the subscription-based computer if the validation module does not authenticate the configuration data;
   a heartbeat module residing on the subscription-based computer including computer storage media having computer executable instructions comprising a heartbeat validation module that receives and verifies an encrypted ping message received from a remote computer using the processor of the subscription-based computer, wherein the network module does not degrade the operation of the subscription-based computer if the validation module authenticates the configuration data and a response to a request for data, sent from the subscription-based computer to the remote computer, and if the heartbeat validation module receives and verifies the encrypted ping message.

10. The system of claim 9 wherein the binding module resides on a Southbridge of the computer.

11. The system of claim 9 wherein the binding module comprises a cryptographic module encrypting the request for data sent from the computer to the remote computer and decrypting the response to the request for data.

12. The system of claim 11 wherein the validation module authenticates the response to the request for data, and wherein the network module degrades operation of the computer if the validation module does not authenticate the configuration data or the response to the request for data.

13. The system of claim 11 wherein the cryptographic module includes a secure memory storing an encryption key.

14. The system of claim 9 wherein the security module further comprises:
a provisioning module that accesses, decrements and stores subscription data, including a number of subscription units, during operation of the computer.

15. The system of claim 9 wherein the network module degrades the operation of the computer if a time between sending the request for data and receiving the response is above a threshold.

16. The system of claim 9 wherein the binding module resides on a peripheral component interconnect (PCI) bus of the computer.

17. A system including a binding module that communicates with a security module of a subscription-based computer, the binding module including a detection module and a cryptographic module, at least one of the binding module and the security module including a memory and a processor physically configured to execute computer executable code for:
accessing, decrementing and storing a number of subscription units in the memory during operation of the subscription-based computer;
receiving, at the subscription-based computer, configuration data from a peripheral device;
authenticating a source of the configuration data;
passing the configuration data to a processor of the subscription-based computer if the source of the configuration data is authentic;
discarding the configuration data if the source of the configuration data is not authentic;
sending an encrypted packet from the subscription-based computer to a remote computer of an independent service provider (ISP) if the source of the configuration data is authentic, the encrypted packet uniquely identifying the subscription-based computer;
receiving an encrypted ping message from the remote computer at a random time interval;
authenticating the encrypted ping message at the computer; and
controlling the subscription-based computer to maintain communication between the ISP and the subscription-based computer if the encrypted ping message is authentic.

18. The system of claim 17 and further comprising:
controlling the subscription-based computer to degrade operation of the subscription-based computer if the encrypted packet is not authentic.

19. The system of claim 17 and further comprising:
controlling the subscription-based computer to degrade operation of the subscription-based computer if the encrypted ping message is not authentic.

* * * * *